United States Patent [19]
Vaia

[11] Patent Number: 5,974,743
[45] Date of Patent: Nov. 2, 1999

[54] SYSTEM FOR PROTECTING A BUILDING, ESPECIALLY FROM NATURAL DISASTERS, THEFT AND VANDALISM

[76] Inventor: Giorgio Vaia, Via Pizzoni 20, 38033 Cavalese Masi (Trento), Italy

[21] Appl. No.: 08/930,727

[22] PCT Filed: May 16, 1995

[86] PCT No.: PCT/IT95/00075

§ 371 Date: Sep. 17, 1997

§ 102(e) Date: Sep. 17, 1997

[87] PCT Pub. No.: WO96/30602

PCT Pub. Date: Oct. 3, 1996

[30] Foreign Application Priority Data

Mar. 28, 1995 [IT] Italy .................................. MI95A0623

[51] Int. Cl.$^6$ .................................................. E02D 1/92
[52] U.S. Cl. .................... 52/169.6; 52/169.1; 52/169.7
[58] Field of Search ............................... 52/169.6, 169.7, 52/169.1, 126.5, 64

[56] References Cited

U.S. PATENT DOCUMENTS

| | | | |
|---|---|---|---|
| 493,301 | 3/1893 | Rowland | 52/64 |
| 592,190 | 10/1897 | Bond | 52/64 |
| 1,343,794 | 6/1920 | Sevczov | 52/64 |
| 1,353,798 | 9/1920 | Stevens | 52/169.6 |
| 1,461,693 | 7/1923 | Bieneck | 52/64 |
| 2,189,486 | 2/1940 | D'Amico | 52/169.6 |
| 2,653,468 | 9/1953 | Rowles | 52/169.6 |
| 2,792,794 | 5/1957 | Miller | 52/169.6 |
| 3,008,435 | 11/1961 | Dupuy | 52/169.6 |
| 4,359,845 | 11/1982 | Harrison | 52/169.6 |
| 4,489,810 | 12/1984 | Curtis | 187/3 |
| 5,319,895 | 6/1994 | Ray | 52/64 |
| 5,365,704 | 11/1994 | Ray | 52/64 |
| 5,794,389 | 8/1998 | Vysma | 52/169.6 |

Primary Examiner—Carl D. Friedman
Assistant Examiner—Dennis L. Dorsey
Attorney, Agent, or Firm—Michael J. Striker

[57] ABSTRACT

The system for protecting a building (10,100) includes a rigid flat structure (11,101) on which the building (10,100) rests; a sunken garage (12,110) below ground level (15); vertical telescopic hydraulic jacks (30–33,102,103) extending from the bottom of the sunken garage (12,110) for supporting the flat structure (11,101) at any of a number of positions relative to ground level (15); a device for connecting electrical and telephone lines including at least one flexible cable (70) suspended in the sunken garage (12,110) so as to have a U-shaped bend, at least one pulley (71) arranged at the U-shaped bend and by which the at least one flexible cable (70) passes and at least one traction spring (73) connected to the at least one pulley (71) to act on the at least one flexible cable (70); a device for connecting water supply pipes including at least one flexible tube (80) suspended in the sunken garage (12,110) so as to have a U-shaped bend; and a device for providing drainage including a vertical pipe (91) arranged in the sunken garage (12,110) or near the sunken garage and having fixed couplers (92,93,94) arranged at respective heights relative to ground level corresponding to the allowed positions of the building, at least one telescopic connector (25) connected to at least one horizontal branch pipe (24) in the building and at least one manual or automatic control device (26) for operating the at least one telescopic connector (25).

5 Claims, 7 Drawing Sheets

SYSTEM FOR PROTECTING A BUILDING, ESPECIALLY FROM NATURAL DISASTERS, THEFT AND VANDALISM

BACKGROUND OF THE INVENTION

1. Field of the Invention

The present invention concerns a system for protecting buildings where environmental or other needs make this necessary.

2. Prior Art

The greatest problems that our planet has to face, and against which man is almost powerless, are created by natural catastrophies such as hurricanes, flooding, fires, earthquakes.

Other problems that are hard to solve are those caused by criminals and by vandals and these are steadily increasing by evolution both of social customs and by the tactics adopted by those committing such crimes. Further problems still are created by particularly adverse climatic conditions such as exceptional temperatures. As regards the disasters caused by natural calamities the cost of remedying them has now risen as high as thousands of billions of dollars.

It is another object of the present invention to make a contribution towards preventing the above-described type of damage at least for comparatively smaller buildings as will be explained below.

The U.S. Pat. No. 2,653,468 discloses a structure for a building designed especially to provide protection against bombardment.

This protection is obtained by a box-type structure made in the ground, open at the top, able to contain the building constructed on a continuous rigid flat structure supported by a central hydraulic jack, situated in the bottom of the box, by means of which the building can be stood at ground level or be sunk entirely inside the box.

Connection between services inside the box and external branch lines for electricity, telephone, water and drainage essentially consist of rigid pipes joined by elbow joints nearly all of which extend substantially below the building.

Said box can be closed, when the building has been lowered inside it, by a very thick covering slab able to protect the building from bombardment. The above structure has considerable drawbacks, mainly in the oversized central hydraulic jack and the heavy structure of the box especially the covering slab, reflected in the cost of the construction and in its operation because of the complexity of the devices for these purposes.

Connections for electricity, phone, water, drainage by piping with elbow joints are highly complex and present problems of maintenance.

Material will inevitably accumulate at all elbow joints of pipes for fluids.

All connections for electricity and telephone show weak points likely to cause breakdowns, these too at the elbow joints in these connections.

Such problems are increased because about ten articulated joints are needed for each connection. It is well-known that articulations constitute weak points wherever moving parts are joined.

SUMMARY OF THE INVENTION

It is an object of the present invention to protect buildings in peace-time conditions and therefore against natural disasters, theft, vandalism, also to lessen environmental impact where further building creates problems.

This protection is provided both structurally and by its connections for electricity, telephone, water and drainage using simple means able to give long service without exceptional maintenance as will now be explained.

It is an additional object of the invention to provide a system for protecting buildings whereby the building itself is based on a continuous rigid flat structure supported by motor driven means for up and down movement.

The flat structure and means for up and down movement are in turn based on the ground or on the bottom of a garage below ground and of sufficient size to receive the building above. Arrangements are also made for connecting the services inside the house for electricity, telephone and other means of communication, for water and drainage, with cables and piping outside it.

All this is done to allow for the various levels at which the building will be set, either on the ground, at different heights above it or at the bottom of the garage.

There is also a device for watertight closure of the garage after the building has been sunk down inside it.

Preferred devices for vertical movement are telescopic hydraulic jacks installed in specially dug shafts in the bottom of the garage that supports the flat structure.

These jacks are connected to a control panel.

The device for closing the garage is preferably a rolling shutter, locked by a key, and made watertight.

This main shutter preferably comprises two secondary shutters respectively worked by a motor-driven shaft by means of a gear wheel fixed to the shaft and meshing with an articulated rack at the sides of the shutters. The means for connecting internal wiring for electricity to main services, such as telephones and others, comprises flexible U-bent cables inside the garage.

Fixed at one end of these cables is a shunt box for the systems inside the building, placed outside it, and fixed to the other end is another box on the ground close to the foundation pit.

Correct movement of the U-bent cables is ensured by a pulley that pulls on the base of this U. The pulling force is provided by a traction spring or by a counterweight acting on the fork that freely supports the pulley.

Devices for proper connection between main lines for electricity, telephone or other services and those inside the building may also consist of vertical contact bars fixed in one wall of the foundations.

Contacts, which may also be of the rotating type, mounted on a support fixed to the building, can freely slide on these bars which extend for the full vertical movement made by the building.

The means for suitable connection between main water pipes and the piping inside the building consists of a flexible U-shaped pipe inside the garage.

One end of this pipe is joined to a coupling on the system inside the building placed externally to it and the other end is joined to a coupling on the water supply pipe on the ground close to the foundation pit.

Correct movement of the U-bend is determined by a pulley that pulls on the bottom of this U, and by a traction spring, or else by a counterweight that acts on the fork freely supporting the pulley.

The means for connection between the water mains and pipes inside the building may be a rigid articulated tube, inside the garage, fixed at one end to an external coupling on the internal water system and, at the other end, to a coupling on the main pipe on the ground close to the garage.

The means for connection of drainage between the services inside the building and the main drains consists of a vertical pipe placed in the foundation pit or near to it, connected at the bottom to the main drainage system.

Close to the bottom of the pit and at different levels there are horizontal couplings with automatic or controlled valves and fixed openings.

At the end of a horizontal coupling for the drains inside the building there is an opening whose size corresponds to that of the fixed openings.

These latter are placed so as to match at least with the opening for the building when, as the case may require, it is placed inside the garage or at ground level or at a previously fixed distance from the ground.

In this way, having set the building at the desired height, it becomes possible to determine, by means of a manual or automatic connector, the connection between the aperture for the building and the fixed one opposite it.

The means for connecting drains between the services inside the building and the main drainage system may be a vertical telescopic pipe one of whose ends is connected to a coupling on the internal drains and the other end to the main drainage system.

In one advantageous embodiment, between the base of the building and the flat structure there is a layer of elastic material able to absorb and deaden earthquake shocks.

As an alternative this layer may be placed on the bottom of the garage.

The hydraulic jacks can in fact be lowered to leave the building resting freely on this layer.

All controls for vertical movement of the building, for closing or opening the shutter, for possibly making the drainage connections between the building and the external mains motor-driven at the different levels, as well as all the needful safety and signalling devices, are joined up to an external control unit placed close to the garage.

The purpose of this is to enable the user to decide how the building shall be placed according to circumstances, either from inside or from outside the building.

The invention offers evident advantages.

Having the house protected inside the sunken garage provides the quickest and safest total defence not only against hurricanes but also against fire, extremely low temperatures and other natural calamities.

The operations of lowering the house inside the garage as soon as there is any risk of danger and of raising it once more to ground level are extremely quick and easy everything being done by the control unit inside the house. The most useful and thorough protection is also ensured against theft and wilful damage.

This kind of protection is of great interest in the case of isolated houses used for holiday homes left uninhabited for most of the year and at the mercy of criminals. Problems of environmental impact are also eased in the case of holiday homes which for many months can thus be enclosed underground and completely invisible.

If there is a risk of flooding the possibility of lifting the house above ground level offers a solution, in places subject to such periodic calamities, that allows such areas to be populated and protection given of buildings satisfying particular social needs, for better control and protection of the area as well as for purposes of observation.

In the event of an earthquake, the protection given by the garage may be decisive, especially bearing in mind the possible application of elastic layers under the house, for absorbing and deadening shocks and vibrations. In consideration of the very great number of areas where high risks of calamity exist such as Florida, California, other states of the U.S., Japan, south-east Asia, the Low Countries and many others throughout the world, and the enormous social and economic costs weighing on individuals and countries, including costs of anti-theft protection, insurance against fire and other calamities, it is clear that the invention provides a valid solution in terms both of safety for people and of costs.

BRIEF DESCRIPTION OF THE DRAWING

The objects, features and advantages of the invention will now be illustrated in more detail with the aid of the following description of the preferred embodiments, with reference to the accompanying figures.

DETAILED DESCRIPTION OF THE INVENTION

The house 10 with its flat roof has a base structure 11 of flat rigid metal supported by four hydraulic jacks 30–33 fitted into shafts 13,14 of the sunken garage 12.

Figure 1:
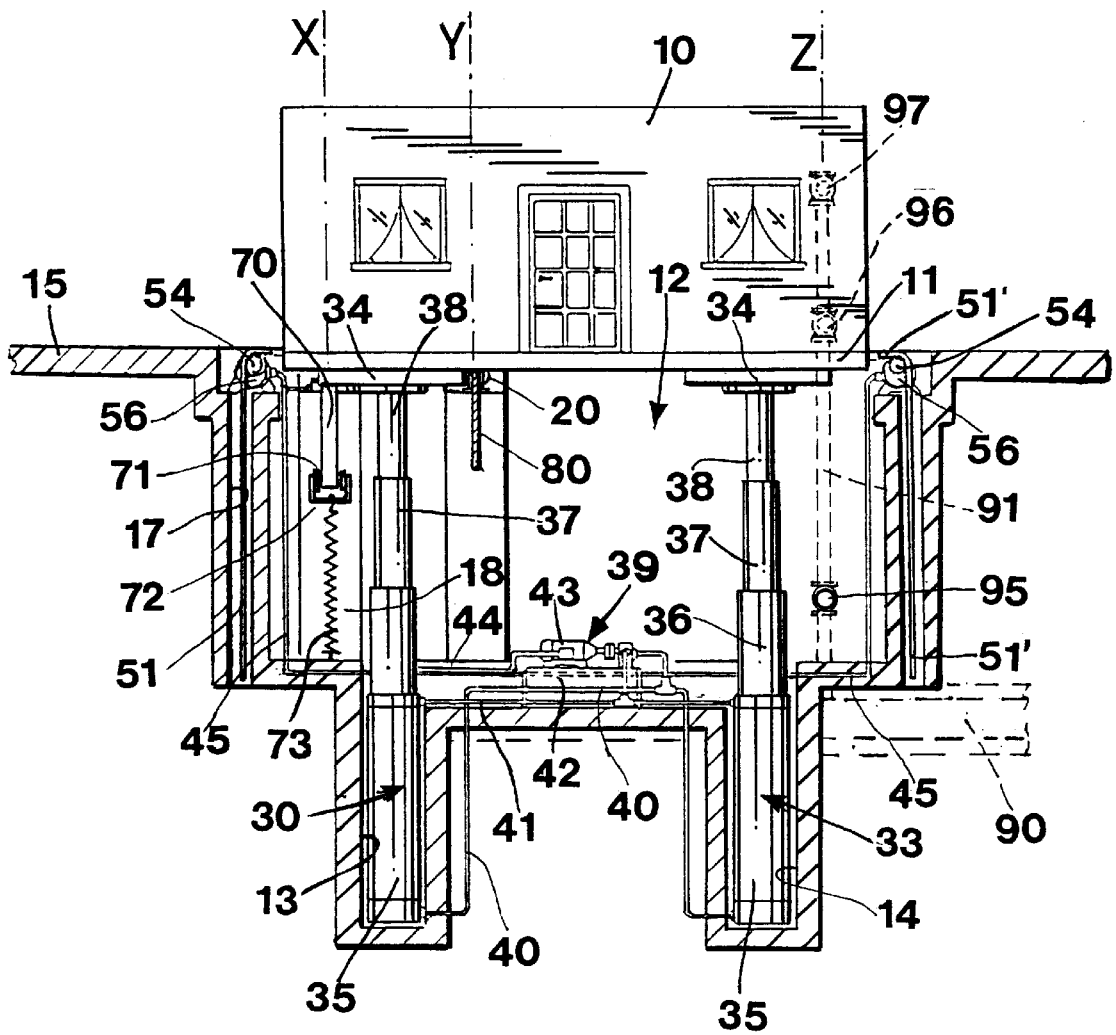
FIG. 1 is a longitudinal cross-sectional view of a small flat-roofed house supported at ground level by hydraulic jacks placed on the bottom of a sunk garage closed by a horizontal rolling shutter.
Figure 8:
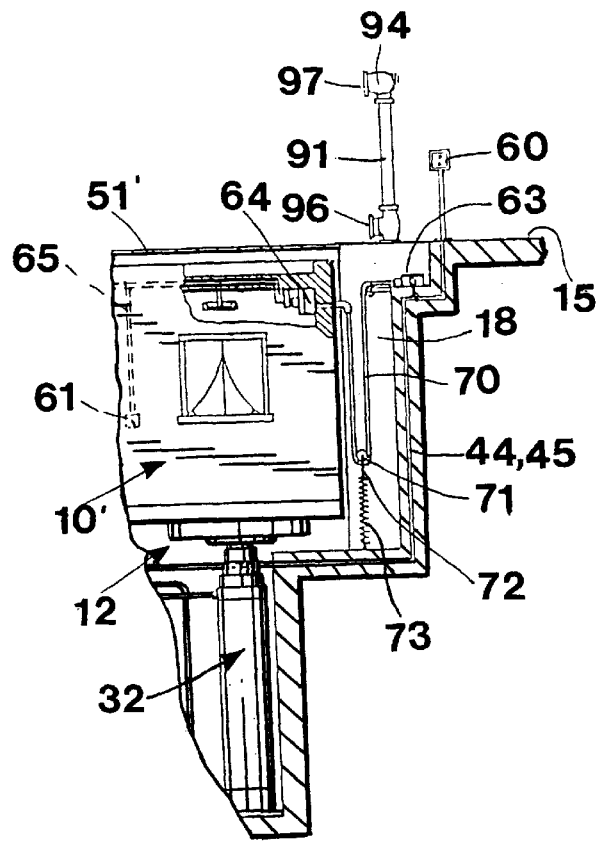
FIGS. 8, 9, 10, are respective detailed cutaway perspective views of connections for electricity, telephone, water, drainage for the house in FIGS. 1–3, taken along section lines X,Y,Z.

The jacks are telescopic and substantially consist of four cylindrical bodies 35–38 of decreasing diameter. The flat plates 34 at the top are fixed to the cylinders 38. Piping 40 and 41 connects the cylinders 35 to the hydraulic drive unit 39 comprising an oil tank 42 and electric motor 43 operated by the control panel 60 placed at the side of the garage 12, connected by electric wiring 44, (FIGS. 1, 8).

This panel 60 in turn communicates with a substantially similar panel 61 placed inside the house 10 (FIG. 8) by junction box 65 and flexible cable 70, as will be later explained.

Figure 7:
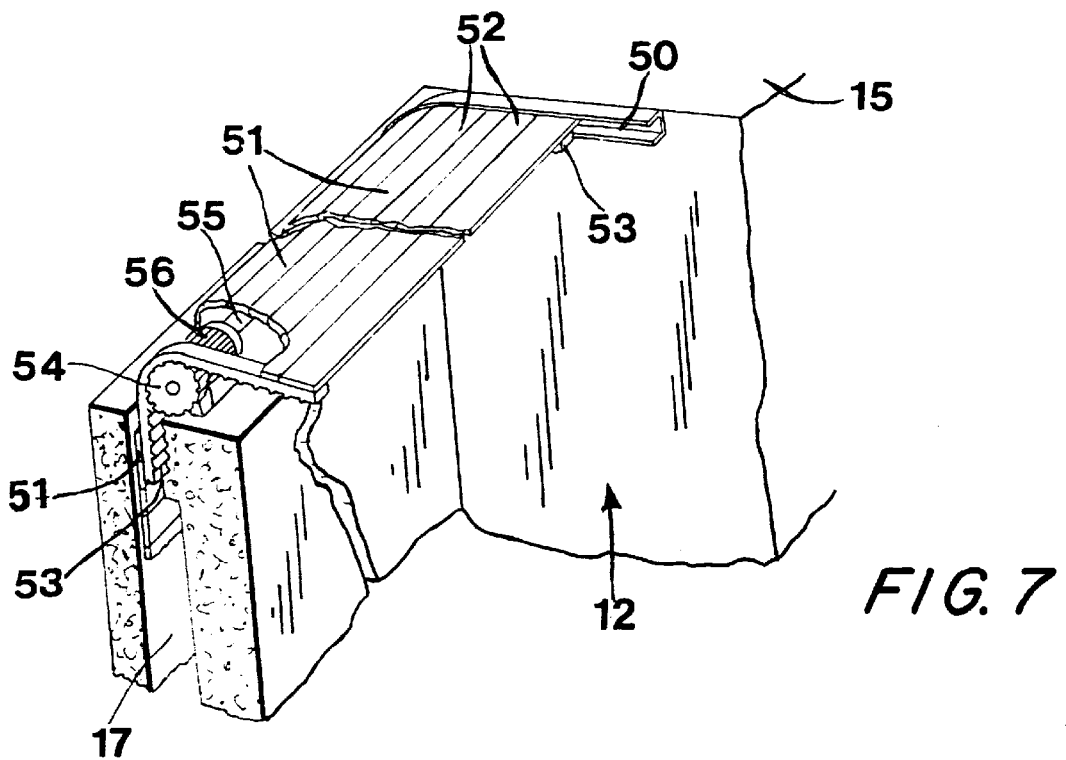
FIG. 7 is a cutaway perspective view showing detail of a rolling shutter for a garage.

Therefore by operating these panels 60 and 61 outside and inside the house, this house 10 can be lowered to position 10' inside the garage 12 or else raised to position 10". Close to the sides of the garage 12 are a pair of metal rails 50 (FIG. 7) for the rolling shutters 51, 51' that consist of articulated slats 52 with a rack 53 that engages with the crown wheels 54 on the shaft 55, worked by the electric motors 56.

When out of use these shutters remain rolled up inside the lateral cavities 17 of the garage 12.

The electric motors 56 are connected to the control units 60,61 by lines of wiring 45 (FIGS. 1, 8).

When the house 10 has been lowered into the garage 12, this garage can therefore be closed from inside the house or from outside it by causing the shutters 51, 51' to move one towards the other until they meet in the middle of the garage.

The electricity and telephone lines are connected to the junction box 63 already mentioned, close to the control panel 60, and are connected at the junction box 64 to the drive unit 61 for the system 65 inside the house by means of the multi-cable band 70 laid inside the vertical channel 18 in the garage.

The band forms a U-bend as shown in FIG. 8.

At the center of the bend is the pulley 71 supported by the fork 72 which is pulled by the spring 73 fixed to the bottom of the garage 12.

This device ensures continuous and regular connection for electricity and telephone at the various levels at which the house may be set since the spring 73 allows the band 70 to move but keeps it adequately stretched.

Figure 9:
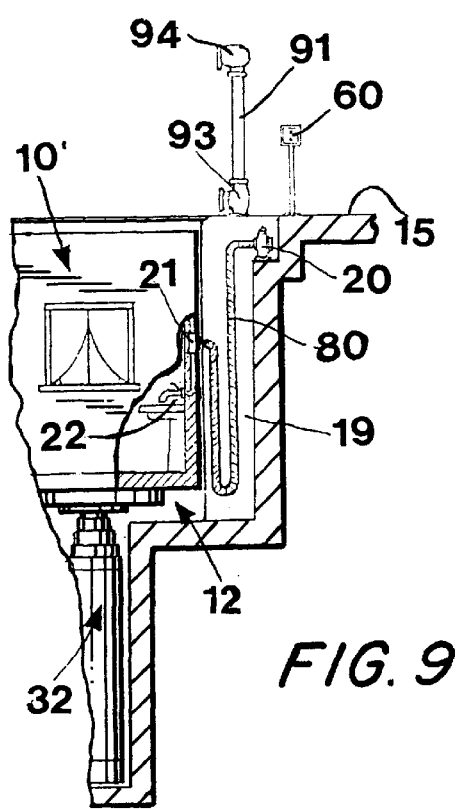

Water supplies are ensured by the external coupling 20 to the mains placed near the side of the garage (FIG. 9). This coupling is connected to the internal coupling 21 inside the house by a flexible U-bent tube 80 laid in the channel 19 so that it can easily follow the vertical movements of the house.

The coupling 21 is connected to the taps 22 in the bathroom and to all other water take-off points in the house. The drainage system 90 from outside is connected to the vertical pipe 91 which has at least three couplings: 92 at the bottom of the pit, 93 at ground level and 94 above with the fixed apertures 95, 96, 97.

Figure 10:
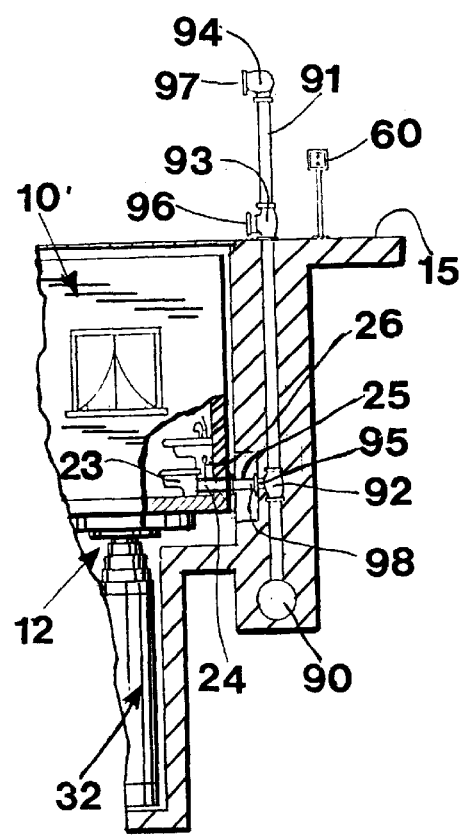

In the bathroom 23 (FIG. 10) the horizontal branch pipe 24 may be seen with a mouth 98 whose size is that of the fixed apertures 95–97.

Figure 2:
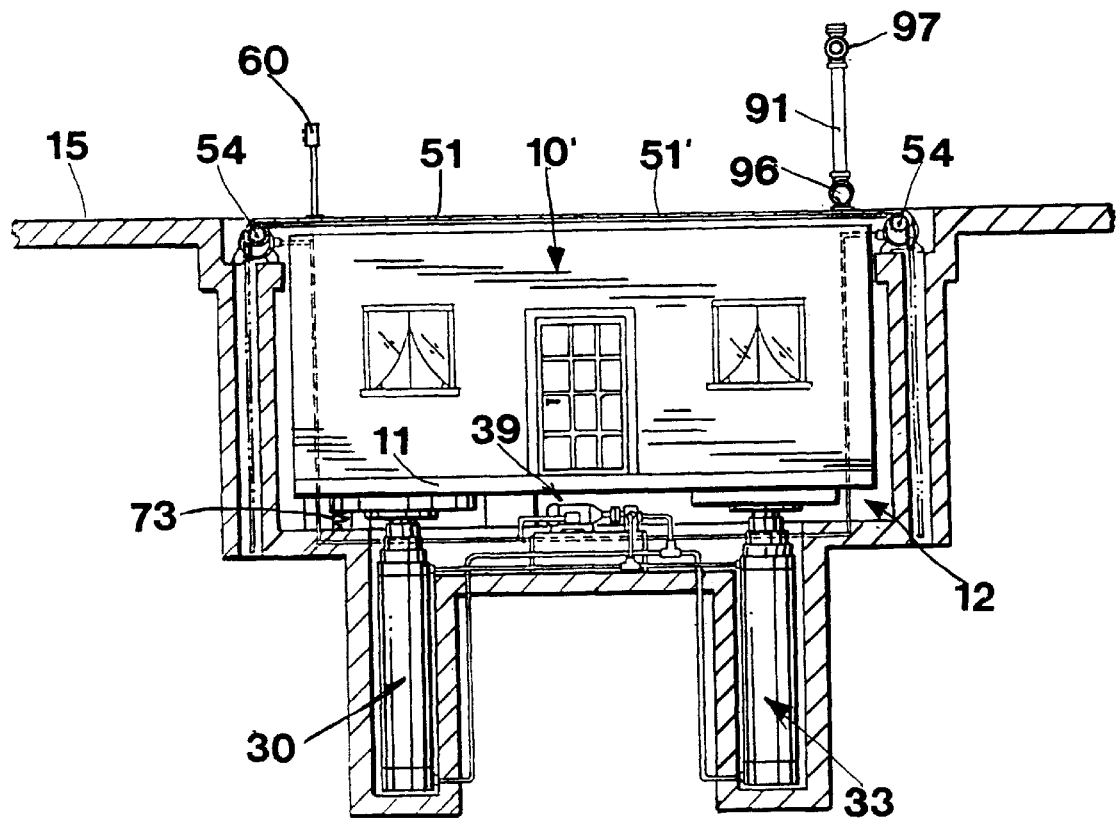
FIG. 2 is a longitudinal cross-sectional view of the house in FIG. 1 lowered into the garage.

Said branch pipe 24 comprises a telescopic connector 25 by means of which, with a hand or automatically controlled device 26, the mouth 98 can be fitted into the mouth 95 on the coupling 92 when the house (FIGS. 2, 10) is down inside the garage 12.

Figure 3:
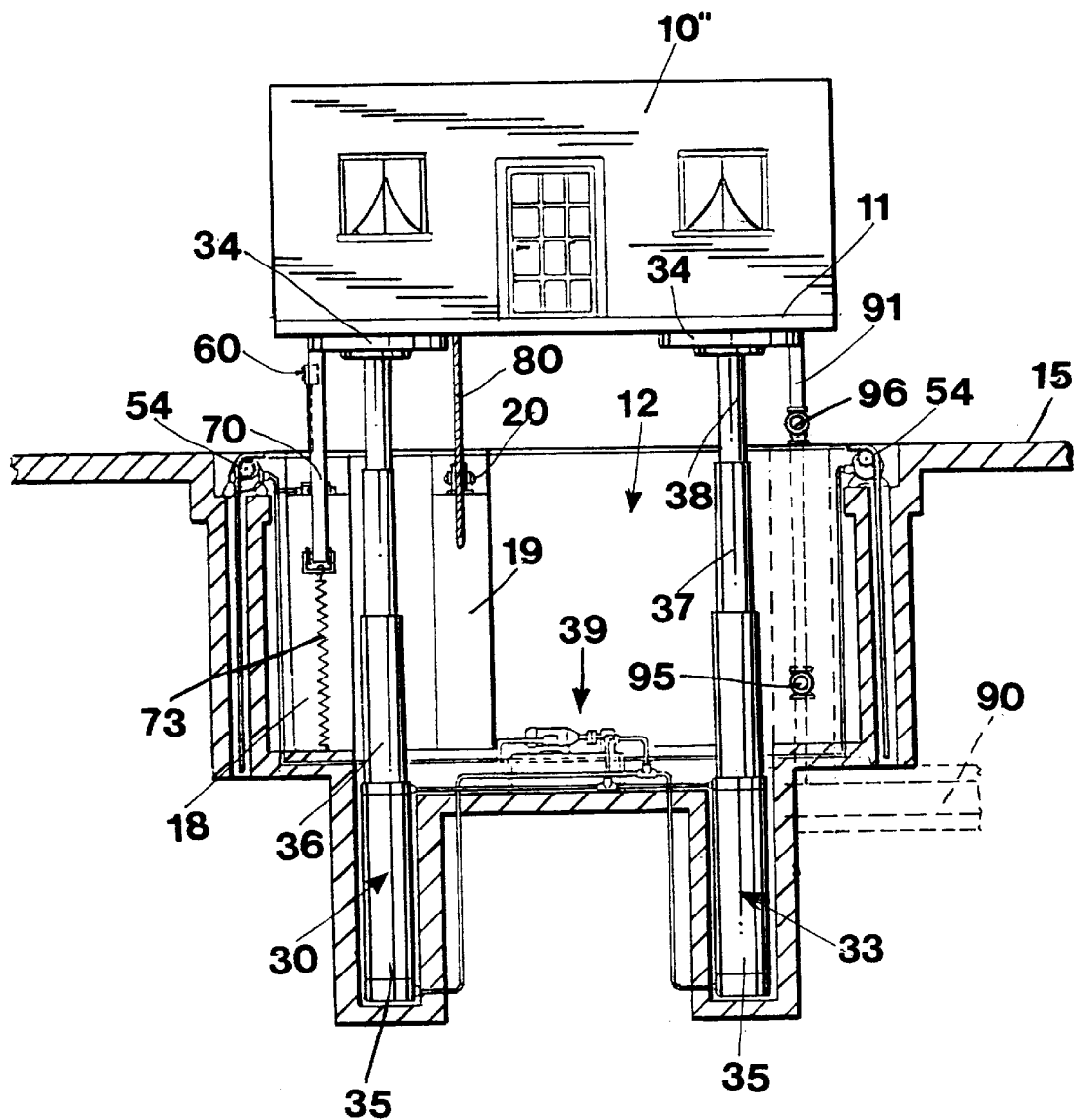
FIG. 3 is a longitudinal cross-sectional view of the house in FIG. 1 raised up.
Figure 4:
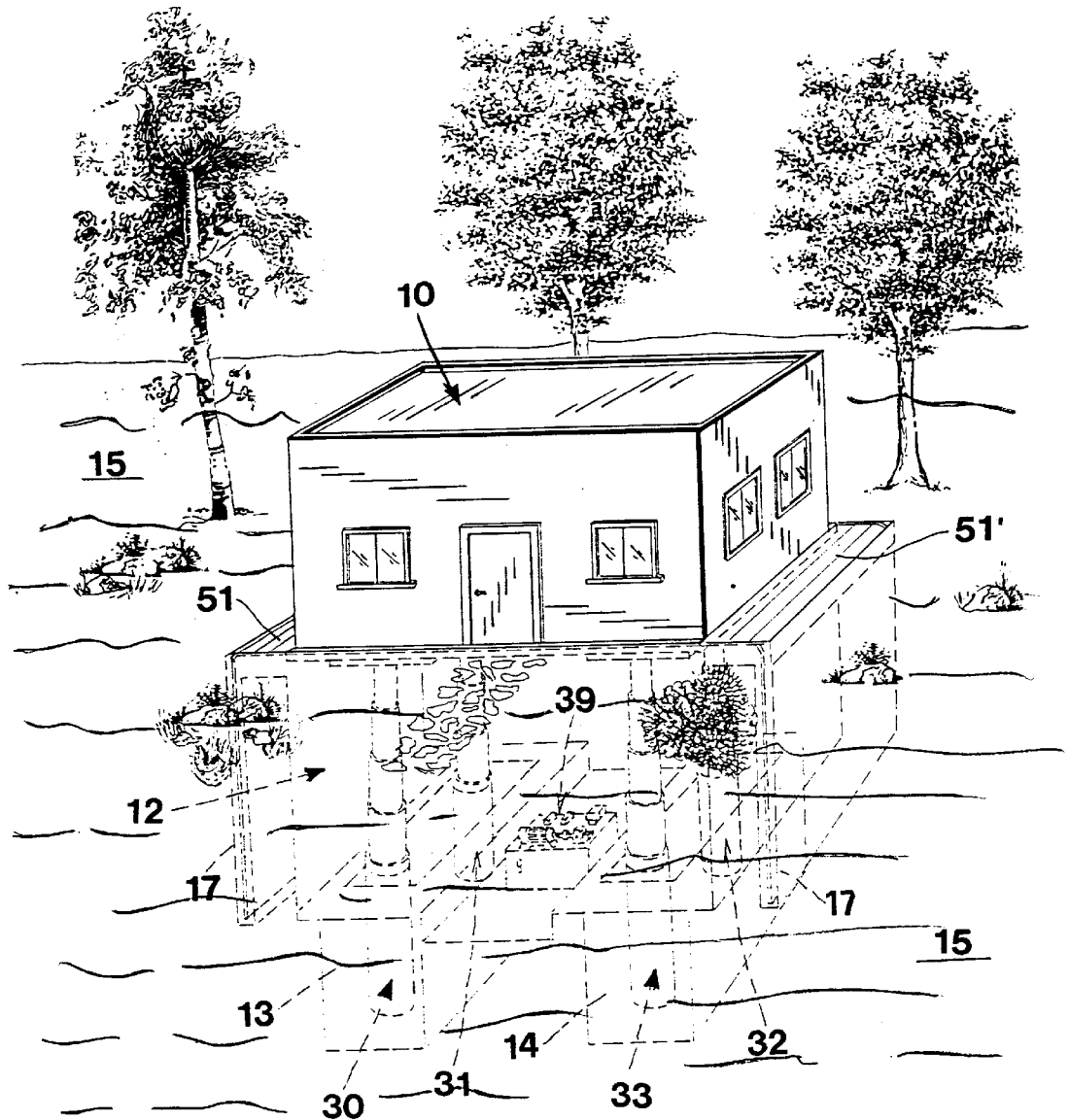
FIG. 4 is a perspective view of the house in FIG. 1.
Figure 5:
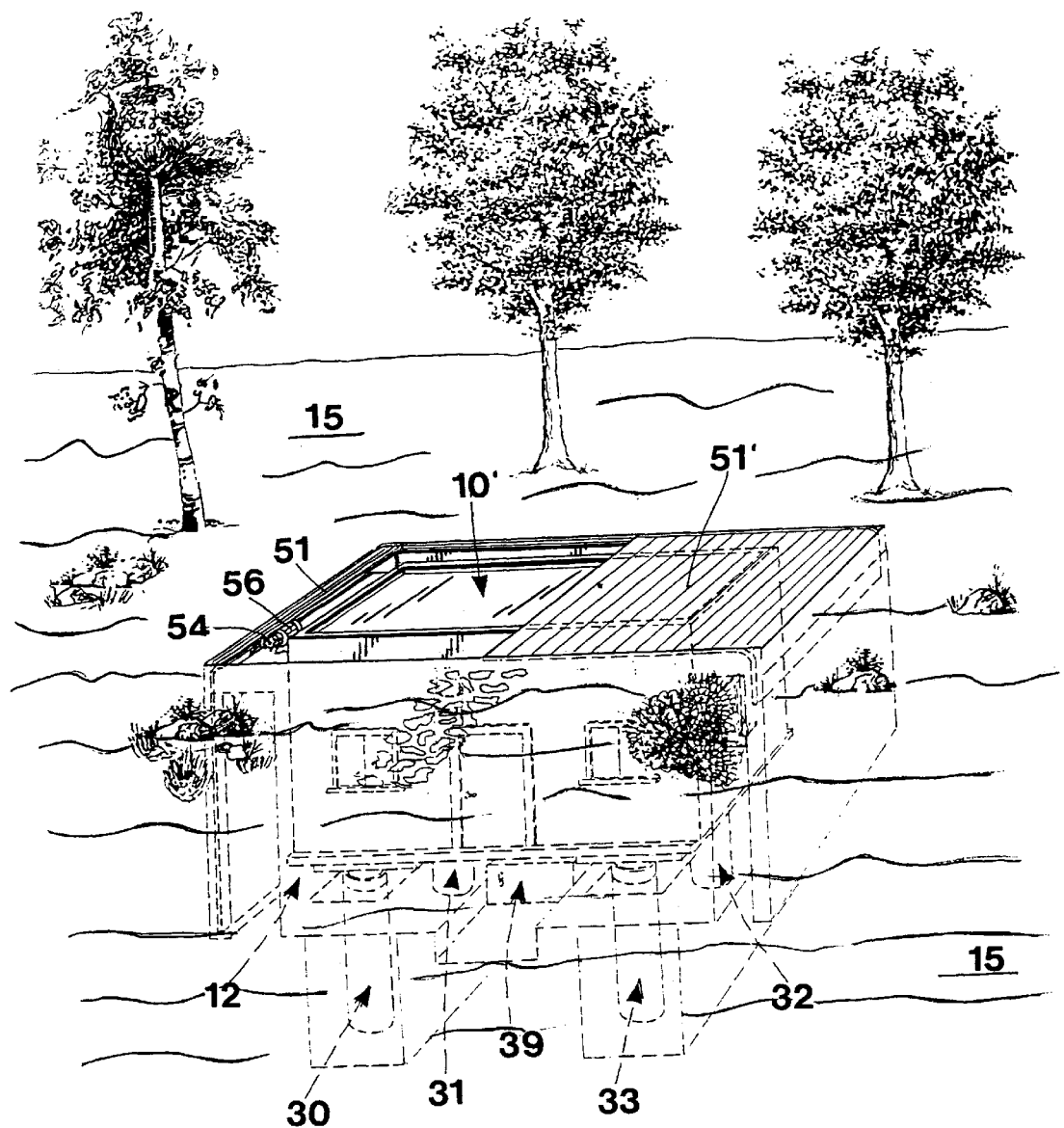
FIG. 5 is a perspective view of the house in FIG. 2.

When the house is raised to ground level 15 (FIG. 1), or to some height above it (FIG. 3), that mouth 98 fits into mouths 96,97 respectively on external couplings 93, 94. It is thus clear that the services for supplying electricity, for telephone connections, for water and for drainage are ensured for all levels at which the house may be placed, and this is done by automatic and centralized controls inside and outside the house itself.

Figure 6:
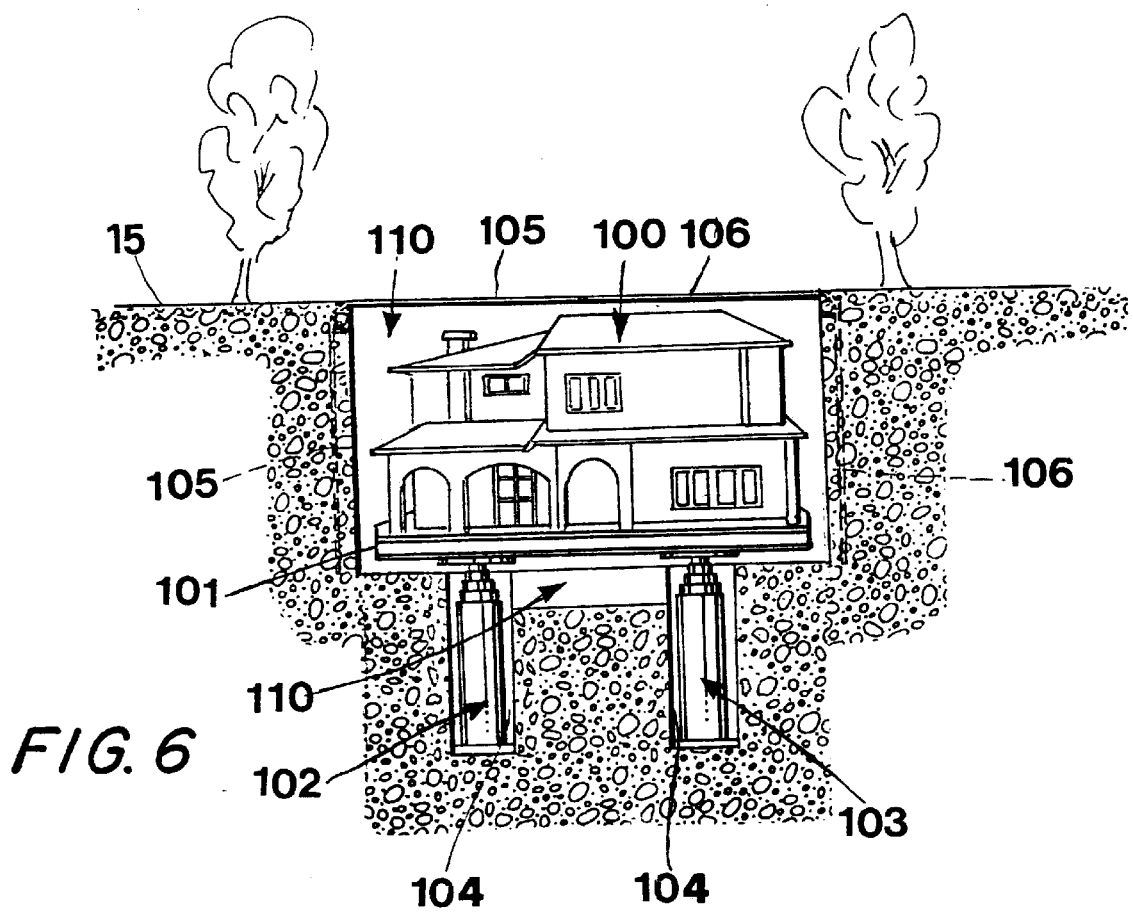
FIG. 6 is a longitudinal cross-sectional view of a house with two floors and several rooms resting on hydraulic jacks, lowered inside a sunken garage.

FIG. 6 illustrates adaption of the invented system to a building 100 consisting of several rooms and on two floors of whatever architectural design.

When there is an adequate flat base structure 101 and hydraulic jacks of suitable power, such as 102 and 103 driven into the shafts 104 at the bottom of the garage 110, this building can in fact be raised and lowered to different levels.

The shutters 105 and 106 enclose the garage 110 and can make it watertight.

As shown in FIG. 6, a layer 111 of elastic material for absorbing and deadening earthquake shocks may be provided between building 100 and the continuous rigid flat structure 101. Further a layer 111' of elastic material for absorbing and deadening earthquake shocks may be laid on the bottom of the sunken garage so that the building 100 rests freely on the layer 111' when it is lowered into the sunken garage.

I claim:

1. A system for protecting a building (10,100) against natural disasters, theft and vandalism with minimum environmental impact, said system comprising a continuous rigid flat structure (11,101) on which said building (10,100) rests;

a sunken garage (12,110) arranged below ground level (15) of sufficient size to receive said building (10,100) and having a bottom;

a plurality of vertical telescopic hydraulic jacks (30–33, 102, 103) extending from said bottom of said sunken garage (12,110) for supporting the flat structure (11, 101) on which said building rests at any of a plurality of positions relative to said ground level (15), said building being received in said sunken garage in at least one of said positions and being at ground level in at least one other of said positions;

means for connecting electrical and telephone lines for providing electrical energy and communication by telephone to said building, said means for connecting electrical and telephone lines comprising at least one flexible cable (70) suspended in said sunken garage (12,110) so as to have a U-shaped bend, at least one pulley (71) arranged at said U-shaped bend and by which said at least one flexible cable (70) passes and at least one traction spring (73) or counterweight connected to said at least one pulley (71) to act on said at least one flexible cable (70), one end of said at least one flexible cable (70) being fixed on or in ground outside of said sunken garage (12,110) near said sunken garage and another end of said at least one flexible cable (70) opposite to said one end being fixed in said building (10,100);

means for connecting water supply pipes to supply water to said building, said means for connecting water supply pipes comprising at least one flexible tube (80) suspended in said sunken garage (12,110) so as to have a U-shaped bend, one end of said at least one flexible tube (80) being fixed on or in the ground outside of said sunken garage (12,110) near said sunken garage and another end of said at least one flexible tube (80) opposite to said one end being fixed in said building (10,100); and means for providing drainage for said building comprising a vertical pipe (91) arranged in the sunken garage (12,110) or near the sunken garage and having a plurality of fixed couplers (92,93,94) arranged at respective different heights relative to said ground level corresponding to said positions, at least one telescopic connector (25) connected to at least one horizontal branch pipe (24) in said building and at least one manual or automatic control device (26) for operating said at least one telescopic connector (25) to make connection to one of said fixed couplers (92,93,94) when said building (10,100) is placed in one of said positions relative to said ground level (15).

2. The system as defined in claim 1, further comprising means for opening the sunken garage and for closing the sunken garage in a water-tight manner, and wherein said means for opening and for closing the sunken garage includes two rolling shutters (51,51',105,106), each of said rolling shutters comprising a plurality of articulated slats (52), and means for opening and closing said rolling shutters, said means for opening and closing said rolling shutters comprising respective articulated racks (53) connected to said rolling shutters and respective motor-driven shafts (55), each of said motor-driven shafts having a gear wheel (54) fixed thereon and engaged with a respective one of said articulated racks.

3. The system as defined in claim 1, further comprising a layer (111) of elastic material for absorbing and deadening earthquake shocks between said building (100) and said continuous rigid flat structure (101).

4. The system as defined in claim 1, further comprising a layer (111') of elastic material for absorbing and deadening earthquake shocks laid on said bottom of said sunken garage so that said building rests freely on said layer (111') when said building (100) is lowered into said sunken garage.

5. The system as defined in claim 1, further comprising a drive and control panel (61) arranged inside said building and another drive and control panel (61) arranged outside said building, said drive and control panels (60,61) including indicator devices, safety devices, controls for vertical movement of said building, controls for closing or opening said rolling shutters and controls for said means for providing drainage, whereby a user decides which of said positions in which said building should be arranged and operates said controls to raise or lower said building to a predetermined one of said positions.

* * * * *